United States Patent Office 3,503,868
Patented Mar. 31, 1970

3,503,868
METHOD OF EXTRACTING AND CONVERTING PETROLEUM FROM OIL SHALE
Carl D. Shields, 1301 Shipley Road,
Wilmington, Del. 19803
No Drawing. Continuation-in-part of application Ser. No. 651,362, July 6, 1967. This application Nov. 6, 1967, Ser. No. 680,982
Int. Cl. C10g 1/00
U.S. Cl. 208—11
9 Claims

ABSTRACT OF THE DISCLOSURE

Solid hydrocarbon material known as "kerogen" is recovered from its geological matrix by impregnating crushed matrix with a hydrogen-containing solvent for the kerogen, charging the impregnated matrix into a rotatable pressure reactor equipped with crusher balls, rotating and heating the reactor and its contents under pressure to promote thermal cracking and solubilization of the kerogen, and suddenly releasing the accumulated pressure from the reactor into a fractionating tower, thereby pulverizing the matrix and helping to release the kerogen from the matrix. Subsequently, a reactive chemical agent may be charged into the reactor with additional solvent, and heating and rotating of the closed reactor is continued while pressure again builds up in the reactor and the agent reacts with kerogen components at a cracking temperature. Pressure is again released suddenly. The latter steps are repeated as desired. The latter reaction step also can be carried out in the presence of radio frequency electrical wave energy. In a preferred embodiment, the solvent used is one having a high hydrogen atom content, such as a hydrocarbon liquid, which will crack sufficiently at the temperature used to react with the kerogen.

---

This invention is a continuation-in-part of my application Ser. No. 651,362, filed July 6, 1967, now abandoned for "Method of Extracting Petroleum From Oil Shale."

BACKGROUND OF THE INVENTION

Field of the invention

The invention relates to the recovery of petroleum hydrocarbons, particularly solid hydrocarbons commonly referred to as "kerogen," from oil-bearing shales wherever such oil-bearing materials are found.

Description of the prior art

Production of free-flowing petroleum hydrocarbons from oil-bearing sands is usually carried out by conventional methods involving drilling of a bore hole down to the oil level of the oil-bearing strata in the earth and withdrawing the liquid from the sands. However, non-free-flowing hydrocarbon material in a viscous, semi-solid or solid form is not readily recoverable from such geological matrix where it is found, particularly from oil shales.

Oil shale is a natural sedimentary rock containing deposits of petroleum hydrocarbons, and other materials generally associated with the definition of the broad term petroleum, which are bituminous-like in form in that these deposits will not flow unless heated to about 400° F. These deposits are broadly referred to as "kerogen." They are characterized by low solubility in hydrocarbon solvents. The deposits occur world-wide. Large deposits are found in Colorado, Utah, Wyoming and Texas.

It is economically desirable to recover the kerogen deposits (estimated at 600 billion to two trillion barrels in western United States) so that they can be refined into gasoline, fuel oil and various chemical products and by-products. A sediment should produce 15 gallons of oil per ton to be classified as an oil shale. Commercial grades of oil shale give 25–50 gallons of oil per ton and extremes of 150 gallons per ton have been found.

Recovery of kerogen from oil shales has been the object of many commercial and governmental agency studies and several commercial processes have been practiced for many years where the oil shales were readily reached. The usual process comprises mining the geological matrix rock, crushing it, and subjecting the crushed matrix to heat in a retort to distill off the kerogen. This process requires substantial amounts of heat and results in considerable coking of residues. More recently proposed processes directed to deep underground deposits resort to the use of high temperature steam for hydrotorting of kerogen from oil shale deposits, or to the use of heated natural gases. A typical patent which discloses the state of the art is that of J. W. Marx et al., U.S. 2,813,583. Marx et al. inject a hot fluid, such as steam or flue gas into underground layers of horizontally fractured sandbeds and depend on the hot fluid to melt sufficient amounts of solid petroleum deposits which can be recovered as a fluid through the bore hole to make the process economically feasible. In such a process, penetration of the hot fluid through the matrix by the displacement of the kerogen may occur slowly and resolidification of the melted petroleum may occur if there is a drop in temperature, thus causing plugging of the penetrated matrix by the higher melting materials. Proposals by the U.S. Department of the Interior include planned processes for disintegration of deep underground deposits with nuclear energy. Such a process is disclosed by Jacobs and Wright in U.S. 3,342,257. Jacobs and Wright carry out an underground nuclear explosion to crush the matrix and then establish a hot zone underground by means of heat from burning of a combustile gas or by other heating means to retort the shale oil to the mine surface.

SUMMARY OF THE INVENTION

The present invention comprises impregnating mined and crushed geological matrix, e.g., oil shale, with a hydrogen-containing solvent for the kerogen and maintaining the matrix in contact with the solvent for a period of time sufficient for the kerogen to be impregnated by the solvent. The solvent-impregnated matrix is then charged into a rotatable high pressure reactor which is provided with heating means and which contains crusher balls, preferably of heat conductive material, e.g., steel. The reactor is provided with a quick-opening vent valve which is connected to a line leading to a high pressure petroleum fractionating tower. The reactor is closed, heat in the range used for mixed phase petroleum cracking operations is applied and the reactor is rotated. The crusher balls grind the matrix into smaller particles, which are more readily accessible to the solvent and to the reactant agent introduced as later described. The crusher balls also serve conductively to heat the matrix. Pressure is permitted to rise in the closed reactor, causing increased solubilization of the heated kerogen by the hot solvent. The hydrogen from the solvent reacts with the kerogen to convert it into compounds volatile at 400–500° F. After a suitable grinding, heating, solvating, and converting period, a significant portion of the kerogen is made volatile. The vent valve of the reactor is opened suddenly to release the pressure. The sudden release of pressure causes the solvent in the matrix particles to expand almost explosively thereby pulverizing the ground particles into still finer particles. Solvent and low boiling kerogen products boil out of the reactor. The rapidly boiling materials entrain some higher boiling kerogen compounds and carry them out of the reactor. After the pressure in the reactor has dropped to a set lower limit, the vent valve is closed and more solvent is charged into the reactor. A reactive chemical agent, which may be a hydrogenating agent, an alkylating agent, a cracking agent, or other petroleum converting agent is also charged into the reactor. Heating and rotating of the reactor and its contents are continued for a suitable reacting, cracking, converting and solvating period while pressure again builds up in the reactor. At the end of this period, the pressure is again suddenly released from the reactor into the fractionating tower. The operating cycle of charging with solvent and with reactive chemical agent, rotating, reacting and sudden pressure releasing is repeated until substantially all the kerogen economically feasible to recover has been recovered from the matrix. The spent matrix is then discharged from the reactor and the unit prepared for the next charge of crushed solvent-impregnated shale oil matrix. The products vented into the fractionating tower are condensed and separated by distillation in a known way.

In another embodiment, the reactive chemical agent may be a hydrogenating agent, e.g., hydrogen gas, methane, or propane which is dissolved in the solvent which is used to originally impregnate the shale matrix.

In a preferred embodiment, the solvent which is used to impregnate the shale matrix is a hydrocarbon which contains chemically bound hydrogen which will be released by thermal cracking at the temperatures used in carrying out the invention. About 2000 standard cubic feet of hydrogen are consumed in hydrogenating a barrel of shale oil. Therefore, optimumly, this amount of hydrogen or its equivalent is required for practice of the invention using a hydrogenating agent.

DESCRIPTION OF THE PREFERRED EMBODIMENTS

The principal objective of the invention is to provide an improved method for extracting, or recovering, while simultaneously converting non-volatiles to volatiles therein, of kerogen from oil shale deposits particularly in remotely located areas where the terrain is difficult and where water supply is low or lacking. The present invention discloses and claims improvements to the method disclosed and claimed in the above-disclosed patent application.

The objective of the invention is achieved mainly by three improvements. The first is that crushed oil shale is heated and pressurized in the presence of a hydrogen-containing solvent for the kerogen in a high-pressure reactor to a cracking temperature and then is suddenly depressurized to cause rapid vaporization of the solvent and other volatiles, which results in rupture and pulverization of the oil shale particles. The second is that at least one heating and pressurizing and depressurizing operation is performed on the oil shale in the reactor in the presence of an added chemically reactive agent which is suitable for converting the non-volatile kerogen into volatile fluid compounds which can be more readily solubilized by the solvent and vaporized therewith in the depressurization step. The two improvements can be readily combined into a single process step or into a sequence of such steps to form a combination process according to the invention.

In a third improvement, the improvements described above can be carried out in the presence of an electrical current discharge at a radio wave frequency tuned to the resonance frequency of the molecule of a high molecular weight compound in the kerogen to cause chemical breakdown of the compound to lower molecular weight compounds which are volatile at the temperature used in the reactor.

Referring in more detail to the first improvement, when the solvent-impregnated oil shale is subjected to heating in the closed reactor, the solvent is forced by the rising pressure of vaporized solvent deeply into the kerogen imbedded in the shale particles. Sudden depressurization of the reactor causes the solvent to boil suddenly and to expand rapidly. In doing so, it becomes trapped within the shale particles and builds up pressure sufficient to burst the particles into smaller particles. The kerogen masses in the pores of the shale particles are then more freely exposed to the action of solvent. A problem in the recovery of kerogen is that not only is the kerogen a material of very low solubility, but that the kerogen also is relatively inaccessible to contact by solvent, partly because of the low solubility of the kerogen. The impregnating solvent may be able to enter the pores of the shale to contact surfaces of the kerogen, but until the kerogen particles themselves are further broken up, the relative amount of kerogen surface available to be contacted by solvent is limited by the porosity of the non-kerogen shale material. The combined steps of crushing, heating, and sudden depressurization of the solvent-soaked particles provides the desired exposure of more kerogen surface for solvent and other treatment.

The temperature in the reactor shall be at least that necessary to build a vapor pressure of sufficiently high force, i.e., of sufficient pounds per square inch of pressure, to liquefy the solvent in the reactor and to cause the solvent and other volatiles to boil rapidly when the pressure is suddenly released. Thus, when straight run gasoline is used as a solvent, a temperature at least above about 150° F. is required to adequately vaporize it. Preferably the temperature for the pressurizing-depressurizing operation should be sufficient to raise the vapor pressure in the reactor to at least 100 p.s.i.g. A pressure of about 350 p.s.i.g. is preferably used.

In general, the heating is preferably carried out at a petroleum cracking range temperature, i.e., between about 400 to 900° F. at which temperature the pressure in the reactor will range from about 200 to 1000 p.s.i.g. The effect of the temperature, in addition to raising the vapor pressure of the solvent to the desired range, is to cause thermal cracking of part of the hydrogen-containing solvent, e.g., gasoline, and of cracking and conversion of the higher molecular weight non-volatile hydrocarbons of the kerogen to lower molecular weight volatile compounds in a known way. See for example, Fieser and Fieser, Organic Chemistry, second edition, 1950, D. C. Heath & Company, pages 96–100, for descriptions of conversion and cracking processes used in petroleum recovery. The lower molecular weight compounds are fluids, i.e., gases and liquids, which can be vaporized from the reactor along with the solvent.

The second improvement is especially useful at the end of the first depressurization step in the reactor, which results in the pulverization of the oil shale particles. The heating is continued until the reactor is substantially free of vaporized solvent and vaporized kerogen materials. There remain in the reactor residual solvent vapors, shale and high boiling liquid and viscous, semi-solid to solid, kerogen compounds. The latter compounds represent a considerable portion of the orginal kerogen content of the oil shale. A portion of the high boiling liquid compounds could be removed by raising the temperature in the reactor close to 1000° F., as done in prior art processes. However, such heating would result in considerable coking of the kerogen. A portion of the liquids can also be removed by repeating the above-described process of the invention, i.e., by adding more solvent to the reactor, thereby dissolving more kerogen in the solvent, allowing the pressure to rise, and suddenly depressurizing the reactor to vent off the kerogen containing solvent vapors.

However, it has been found more advantageous to introduce into the reactor a reactive chemical agent which will react with the kerogen compounds either to hydrogenate unsaturated compounds to saturated compounds or to convert kerogen to lower boiling liquids or to alkylate some of the compounds to other hydrocarbon compounds while subjecting the reactor contents to petroleum cracking temperatures. Ultimately, by a variety of chemical reactions which may include hydrogenation in some cases, dehydrogenation in others, carbon-to-carbon fission and rearrangement reactions, substantially all of the higher boiling and non-volatile kerogen components may be converted to volatile compounds which may be vaporized from the reactor by the combined application of a volatile solvent, pressurization and sudden depressurization in accordance with the invention.

Examples of chemical agents which beneficially can be charged into the reactor to achieve the above objective include petroleum gases and liquids, such as the lower alkanes, e.g., methane, ethane, propane, butane, pentane, and hexane, including both straight-chain and branched chain forms thereof and hydrogen. Many of these gases and low-boiling liquids will be recovered from the cracked kerogen itself in the fractionating tower and can be used later in the reactor as well as being used for fuel to heat the reactor.

Hydrogen for the chemical reaction in the reactor also can be formed in the reactor according to the third improvement by subjecting the kerogen to an electrical current discharge from a generator generating a radio wave having a frequency corresponding to the resonance wave of the atoms of a hydrocarbon molecule, e.g., heptane, splitting the carbon-to-hydrogen bonds and producing carbon and hydrogen gas. A hydrocarbon petroleum gas can be introduced into the reactor and treated in the same manner for the same purpose. Methane is preferably used as the hydrocarbon, but other lower hydrocarbons such as ethane, ethylene and so on can be used. The hydrogen then reacts with the higher molecular weight kerogen compounds to convert them to lower boiling compounds.

The passage of an electrical current through solventized oil shale will promote electrochemical dissociation of the kerogen and subsequent recombination of the molecules into a new chemical species. It has been found that the most effective type electrical discharge is a radio frequency capable of causing resonant oscillation of a specific type molecule. This radio frequency discharge may be tuned thereby to provide a high degree of selectively in the chemical whose bonds are to be weakened and broken. For example, a 2.16 megacycle current will excite nitrogen into resonance as indicated by the $-.8216 \times 10^4$ cm./vib. primary spectrum line. Nitrogen-containing compounds in the kerogen can be excited at this frequency and thus dissociated into lower molecular weight compounds.

The reactor temperature and pressure used in the process of the invention may be reduced when a radio frequency discharge is used to stimulate the chemical breakdown of the kerogen. As a practical matter, a high-temperature reduces the electrical requirements. It is noted that the resonant frequency is a function of the chemical specie as well as the temperature and pressure.

Excitation of a molecule to produce a weakened bond or an ion will not cause creation of a new chemical species unless there is a suitable reactant within orbital distance.

The reaction may be enhanced through use of a catalyst, such as columbium-molybdenum, which may be present in the form of electrodes, reactor components, or as added reactor fill media, e.g., catalyst metal deposited on a carrier.

With any of the three improvements described above, catalysts of the type usually used in the petroleum cracking converting operations may be charged to the reactor with the solvent-impregnated matrix and will be useful in promoting the cracking and other chemical reactions involved. Catalysts for this purpose are well-known. See Fieser and Fieser, ibid., chapter 5. However, in many cases, the shale matrix itself may contain alumina, silicates, and traces of other catalytic metals such as iron and manganese which will promote the cracking of the kerogen at the temperatures preferred for practice of the invention.

Preferred solvents for carrying out the impregnation and solubilizing of the oil shale include petroleum distillates such as gasoline, benzene, toluene and kerosene. Other solvents may likewise be used, for example, ethers, e.g., dioxane, halogenated hydrocarbons, e.g., pentachloroethane, ketones, e.g., acetone, and other solvents whether of petroleum or non-petroleum origin, whether organic or inorganic, but in which kerogen is sufficiently soluble to permit impregnation of the matrix with the solvent, especially when heated, and which will release the hydrogen when heated to a petroleum cracking temperature.

Impregnation can be accelerated also by carrying out the impregnation with a solvent in the presence of an adequate quantity of a surfactant soluble in the solvent and having wetting agent properties to aid in penetrating the pores of the crushed matrix and to wet the kerogen therewith. Preferred surfactants are sodium secondary alcohol sulfonates, e.g., sodium dioctylsulfosuccinate (Aerosol OT) and sodium dibutylsulfosuccinate. However, any of the widely-known wetting agents may be used advantageously.

In most cases, the penetration, or soaking with solvent will occur in a few minutes; in other cases, depending on the size and other characteristics of the matrix, the kerogen and the solvent, a longer time may be desirable, but is not necessary because the crushing of the particles in the reactor and heating of the materials therein will increase the penetration of the solvent greatly. The time for penetration of the solvent prior to charging the matrix to the reactor may be shortened by use of non-viscous solvents, various wetting agents and, preferably, by the application of heated solvents. Excess solvent may also be used, particularly if the matrix is to be pumped as a slurry to the reactor site, and the surplus solvent removed by conventional means, such as decanting or centrifuging before charging the matrix into the reactor.

Impregnation of the matrix is accelerated by crushing, grinding, or pulverizing quarried or mined oil-bearing matrix, e.g., oil shale. A particle size of between about $\frac{1}{32}$ inch to 2 inches in diameter is preferred. However, the particle size is not critical for most oil shales and any size from a fine powder to a large lump may be used.

The heat for heating the reactor and its contents can be applied by known methods. The heat preferably is applied by an intermediate heat transfer medium, such as a heated flue gas. A flue gas is made in a remote location by combustion of some of the recovered kerogen. Heating of the particles of matrix in the reactor preferably is promoted by contacting the matrix and heated reactor wall with steel balls, thereby transferring the heat from the wall to the matrix by means of the heated balls.

The vapors recovery step can be carried out also by applying a vacuum to the recovery system in a known way after depressurization. Application of a vacuum causes reduction in boiling temperature and provides a substantial conservation of heat. By using vacuum as well as high pressure, a greater amount of vapors can be recovered in each operating cycle.

The kerogen-freed matrix is recovered from the retort as an expanded shale tailing which can be used as an ingredient in a lightweight concrete aggregate. It may also be processed further to remove its mineral content. It may be reslurried with water to pump it to a storage dump.

The vaporized kerogen products and solvent from the retort may be separated in a known way by known means, e.g., by condensing in a fractionating distillation column to recover the solvent for recycle to the impregnation process and to distill the kerogen into its various oil, wax and chemical components. The kerogen compounds recovered from the reactor also can be subjected further to catalytic cracking or to destructive distillation in suitable known processing equipment to produce gases, a large variety of lower boiling liquid hydrocarbons and other chemicals.

The vaporized kerogen and solvent can also be recovered by means of multistage compression, with interstage cooling, the extracted petroleum fractions and solvent being readily separated by such means.

At some operating sites it may be advantageous to quarry or mine and crush the geological matrix into small particles at a first location and to carry out the recovery of the kerogen at a second, usually nearby, location where the reactor is located. Under such conditions, the process can be practiced by mixing the crushed matrix, e.g., oil shale, with an excess of solvent at the first location, using sufficient solvent to form a pumpable slurry with the matrix. The slurry is then pumped to the second location. Impregnation of the matrix takes place during the movement of the slurry from the first to the second location. The slurry then can be centrifuged or the excess solvent otherwise separated from the impregnated matrix at the second location and the kerogen recovered from the matrix by retorting as already described above.

A preferred method for recovery of the kerogen is to introduce the crushed, solvent-impregnated matrix in the form of slurry into a heated transport pipe in which the matrix can be subjected to cracking temperature. The matrix can be discharged from the pipe into a reactor of the kind described above. The volatiles can be flash vaporized from the matrix in the reactor and other steps carried out as described above.

The process of the invention can also be practiced by carrying out the impregnation of the matrix in situ, i.e., in its underground location where the matrix, e.g., oil shale, is not removed from its natural location. In this embodiment of the process, solvent containing dissolved hydrogen, preferably gasoline, is heated to 400–900° F. and flowed, as a fluid or as a vapor, down the piping of a bore-hole of a well. Sufficient solvent is pumped into the well to penetrate the kerogen-bearing strata. To avoid loss of solvent into sand beds, the bore-hole can be plugged with cement in a known way at the bottom of the oil shale strata. After an impregnation period sufficient for the solvent to penetrate the matrix and substantially soak it with the solvent, and for the hydrogen to react with the kerogen, a vacuum is applied to the bore-hole piping, causing the solvent and dissolved and converted kerogen to boil and distill from the matrix as a vapor. The hot solubilized kerogen also can be pumped to the surface and separated there from the solvent by retorting, preferably under vacuum.

With the foreseeable use in the near future of nuclear energy and other means for carrying out underground disintegration of a kerogen-bearing geological matrix, the process of the invention may be used advantageously to recover the kerogen from the disintegrated matrix mass by impregnating it with a suitable hydrogen-containing solvent in a manner described above.

A benefit of the invention is that recovery of the vast amounts of kerogen can be achieved in remote areas without use of large quantities of water as required for hydrotorting or other water-using processes. An initial, start-up quantity of solvent will need to be supplied to the kerogen recovery site. However, thereafter, suitable solvent, such as gasoline, benzene and other petroleum derived solvents can be recovered from the recovered kerogen by catalytic cracking thereof to perpetuate the supply of solvent needed for continued operation of the process. Catalysts for cracking of petroleum constituents of kerogen are well-known. A typical one is the Houdry type catalyst which consists of silica and alumina in the ratio of 4:1 and about 1% of manganese dioxide.

The process of the invention can be carried out in either batch-wise or continuous operations. A series of reactors may be arranged to carry out various parts of the process. Thus, the crushed matrix may be fed into a hopper leading to a slurry pumping and delivery pipe line, mixed with gasoline in the hopper, and the mixture pumped through the pipe line to a filtration bed at the reactor site where excess solvent is recovered and recycled to the hopper. The line is made sufficiently long so that the matrix is solvent-impregnated by the time it reaches the bed. From the filtration bed the matrix may be charged to a first pressurization-depressurization reactor in which the pulverization step may be carried out. The pulverized matrix then may be discharged into a second reactor where the chemical treatment step may be carried out in addition to the pressurization-depressurization steps. In some cases, the first pulverization step will be adequate for breaking down the matrix, but, if necessary, more than one pulverization step may be carried out as described.

Portions of the recovered kerogen, e.g., gases and tars, can be burned and used as a source of heat energy for heating the solvent and reactor and as a source of hot flue gases and to generate steam to drive turbines and generators for generating electricity at the remote location of the mine or well. Hydrocarbon gases, e.g., methane, methane and propane, recovered from the cracked kerogen, can be used at the site to provide heat or to generate electricity, and can also be used as reactive chemical agents for the recovery of kerogen from the oil shale.

The crude recovered fluid kerogen products and by-products can be delivered by pipeline to suitable shipping points for delivery to established refineries when the recovery step of refined kerogen products would not be feasible at the kerogen producing location.

The invention is illustrated by the following example which is given by way of description but not limitation of the invention as claimed.

EXAMPLE

Crushed oil shale having a kerogen content equivalent to about 25 gallons of shale oil per ton is slurried with an excess of straight run gasoline at ambient atmospheric temperature.

After a period of time sufficient for the gasoline to penetrate into the kerogen, e.g., about one hour, the slurry is centrifuged to remove the excess gasoline. The excess gasoline is recycled for reuse in preparing more slurry. The gasoline-impregnated shale from the centrifuge is charged into a suitable rotatable high pressure vessel which contains steel crusher balls and which is heated to about 500° F. to raise the pressure of the contents to about 350 p.s.i.g. A portion of the gasoline reacts with heat-cracked kerogen components to form volatile soluble petroleum products which are solubilized by the gasoline. The slurry is heated for a period sufficient for the gasoline to dissolve the bitumens and other readily soluble petroleum products in the shale, for the other kerogen components to be cracked by the heating and for part of the gasoline to react with the kerogen. Pressure in the reactor rises to between about 350 and 1000 p.s.i.g.

The reactor is then vented suddenly through a quick-opening vent valve into a dephlegmating chamber which is connected to a line leading to a high pressure-type petroleum fractionating tower. The venting releases the pressure in the reactor and causes vaporized gasoline and solubilized kerogen solutes to escape from the reactor. The vaporizing gasoline undergoes a sudden increase in volume which pulverizes the shale in the reactor into powder. Entrained particles of shale are trapped in the dephlegmating chamber. The venting of the vapors is continued while continuously heating the reactor until the pressures in the reactor vessel and the fractionating tower become substantially equalized.

The pressure in the fractionating tower varies in the range of about 25 to 300 p.s.i.g. depending on the temperature of the tower and the amount of non-condensible gases present. The vapors from the reactor are condensed by cooling in the tower. The condensed vapors are fractionated and recovered as distillates of gasoline and other kerogen components. Non-condensible gases are vented from the tower into a gas separation system where combustible products are separated from inert gases.

When the vapor flow from the reactor has substantially ceased, the vent valve of the reactor is closed. Gasoline is then charged under pressure into the reactor in an amount sufficient to further solubilize more of the kerogen. Also, a petroleum gas, preferably propane, is charged into the reactor in an amount adequate for hydrogenation and other purposes. For example, part of the petroleum gas, e.g., propane, may also react with an unsaturated compound, e.g., ethylene, formed during cracking of the kerogen to give a compound of the two materials, e.g., isopentane. The reactor is rotated and heated to about 600° F. for a period substantially sufficient for thermal cracking, chemical reaction and solubilizing to be carried out. The pressure in the reactor rises to about 350 p.s.i.g. or higher. At the end of the reaction period, the vent valve is again released suddenly to vent the vapors from the reactor into the fractionating tower.

The same cycle of steps is repeated until substantially all of the economically recoverable kerogen components in the shale have been converted to volatile products and recovered. Usually three to six cycles will be adequate, depending on the characteristics of the shale and its kerogen content.

When recovery of the kerogen content has been substantially completed, the reactor is depressurized and a vacuum may be applied to free the spent shale in the reactor from residual volatiles. The hot shale is then discharged into a cooling zone and cooled under inert conditions to prevent ignition of carbonaceous residues in the shale. A screen in the reactor outlet retains the steel crusher balls in the reactor. The reactor is then ready for the next charge of gasoline-impregnated oil shale.

The products from the fractionating tower are distilled in the usual way to separate them into various petroleum distillate fractions, such as fuel gases, gasoline, petroleum ether, light napthas, pentane, hexane, mineral spirits, naphthas, kerosenes, furnace oils, intermediate distillates, heavy distillates, waxes, greases and tars. The gasoline fraction, which consists of part of the originally charged solvent material and that produced from the kerogen, is recycled to the impregnating station.

Recovery of the oil from the starting material is about 130% of Fischer Assay.

The process as described in the example may be modified by deletion or addition of one or more steps. For example, the solvent and solvent-free oil shale can be charged separately directly to the reactor when it is not advantageous to pump the oil shale as a slurry. Impregnation can then take place directly in the reactor. Also, the addition of the petroleum gas could be eliminated when it is desired to recover a greater proportion of unsaturated materials from cracked kerogen. On the other hand, a catalyst such as a Houdry-type alumina-silica-manganese petroleum cracking catalyst can be added to the reactor by mixing it in with the oil shale at the time of charging the reactor. Other modifications likewise can be made as will be apparent to one skilled in the oil shale processing art.

The process of the invention combines solvent treatment of petroleum containing matrix, such as oil shale, with flash vaporization of volatiles, vapor pulverization of the matrix and chemical and thermal conversion of the kerogen material of the matrix to recover the kerogen materials as petroleum products which vaporize at a nominal cracking temperature, e.g., 500–700° F., as compared to 900–1000° F. of the prior art, with a minimum conversion of the kerogen to coke residues. Additionally, the process greatly decreases the stench associated with kerogen retorting in that the odorus sulfur and nitrogen compounds present in the kerogen are converted to less odorous materials or are recovered from the fractionating tower under controlled conditions.

The term solubilizing as used herein is intended to define the phenomena which occur when the solvent contacts the kerogen in the matrix. The phenomena include immediate solution of some of the more readily soluble components of the kerogen, a wetting of undissolved kerogen components as by capillary action, a loosening of the kerogen components in the matrix, promotion of the conductivity of heat into the matrix. The combination of these phenomena results in the kerogen being sufficiently liquefied so that flow of the kerogen from the deep pores and crevices to the surface of the matrix is enhanced. At the surface of the matrix, more rapid solution and liquefaction of the kerogen can then take place under the effects of direct heat transfer and an excess of solvent. One function of the solvent is to liquefy the kerogen sufficiently into at least a semi-fluid mass so that it flows more readily. A second function of the solvent, whether it is a solvent having hydrogen atoms in its molecule or a solvent solution containing hydrogen gas or another hydrogen containing compound dissolved therein, is to react chemically with the kerogen. A third function of the solvent is to rupture the matrix by the pressure created in the solvent-treated kerogen by the expanding hot solvent when it is heated to vaporize it and the pressure is suddenly removed.

The term surfactant as used herein is intended to define substances having the property, generally, of lowering the surface tension of the solvents in which they are dissolved. Low foaming surfactants are preferred.

The term solvent as used herein is intended to define a fluid, whether liquid or gas, which can penetrate and impregnate the kerogen by physical or chemical action thereon, and which, when heated in the matrix will exert sufficient hydraulic or vapor pressure to cause flow of the kerogen therefrom. The term solvent solution includes organic solvents, such as petroleum distillates, and other solvents having dissolved therein hydrogen gas or a compound which releases hydrogen when thermally cracked.

While the invention has been described particularly as a process for extracting kerogen from oil shale and oil sand, it may also be used similarly to extract other materials which are geologically locked within a solvent penetrable matirx and not otherwise readily accessible for recovery, and it is to be understood that the process may be practiced for such recovery without departing from the spirit or scope of the invention as claimed in the appended claims.

I claim:

1. A process for recovering a kerogen from its geological matrix which comprises mixing kerogen-containing matrix with a hydrogen-containing solvent capable of releasing said hydrogen, heating the mixture in a closed vessel at a super atmospheric vapor pressure to cause said solvent to impregnate said matrix, and depressurizing said matrix at a rate sufficient to cause solvent impregnated into the matrix to expand within the matrix with a force sufficient to pulverize the matrix and release hydrogen.

2. The process according to claim 1 wherein the solvent and matrix are heated at a temperature between about the boiling point of the solvent and 900° F.

3. The process according to claim 1 wherein the solvent and matrix are heated at a petroleum cracking temperature.

4. A process for recovering kerogen from its geological matrix which comprises the steps of
   pressurizing kerogen-containing matrix in a closed reactor in the presence of a hydrogen-containing solvent thereby impregnating said solvent in said matrix,
   heating said solvent-impregnated matrix to a temperature sufficient to raise the vapor pressure of said solvent to at least about 350 p.s.i.g.,
   releasing the vapor pressure from the reactor at a rate sufficient to cause the solvent impregnated in the matrix to expand within the matrix with a force sufficient to pulverize the matrix; and
   removing volatile kerogen compounds and solvent from said reactor and said solvent releasing hydrogen during the process.

5. The process according to claim 4 which comprises closing the reactor after said removing step and charging hydrogen-containing solvent into the reactor in an amount sufficient to solubilize kerogen remaining in the reactor, heating the reactor contents at kerogen cracking temperature for a period of time sufficient for cracking and conversion of high boiling kerogen compounds to lower boiling compounds to occur, and removing volatiles from the reactor by means of at least one flash vaporization.

6. The process according to claim 5 which comprises repeating said charging, heating and removing of volatile steps until volatile kerogen compounds are substantially removed from the reactor.

7. The process according to claim 4 wherein the temperature is in the range from about 400 to 900° F.

8. The process according to claim 6 wherein the temperature is in the range from about 400 to 900° F.

9. The process of claim 4 and the step of crushing the kerogen-containing matrix while pressurizing and heating the same.

References Cited

UNITED STATES PATENTS

| | | | |
|---|---|---|---|
| 2,601,257 | 6/1952 | Buchan | 208—11 |
| 2,639,982 | 5/1953 | Kalbach | 208—11 |
| 2,881,126 | 4/1959 | Glinka | 208—11 |
| 3,074,877 | 1/1963 | Friedman | 208—11 |
| 3,117,072 | 1/1964 | Eastman et al. | 208—11 |
| 3,281,349 | 10/1966 | Evans | 208—11 |
| 3,346,481 | 11/1967 | Johnsen | 208—11 |

HERBERT LEVINE, Primary Examiner

U.S. Cl. X.R.

166—303